United States Patent [19]
Izume

[11] Patent Number: 4,954,686
[45] Date of Patent: Sep. 4, 1990

[54] HIGH SPEED RMS CONTROL APPARATUS FOR RESISTANCE WELDERS AND HIGH SPEED RMS CONTROL METHOD THEREOF

[75] Inventor: Takatomo Izume, Urawa, Japan

[73] Assignee: Kabushiki Kaisha Toshiba, Kawasaki, Japan

[21] Appl. No.: 342,885

[22] Filed: Apr. 25, 1989

[30] Foreign Application Priority Data

Apr. 25, 1988 [JP] Japan .................. 63-100272

[51] Int. Cl.$^5$ ............................................. B23K 11/24
[52] U.S. Cl. .................................... 219/110; 219/115
[58] Field of Search .................... 219/109, 110, 115

[56] References Cited

U.S. PATENT DOCUMENTS 4,104,724 8/1978 Dix et al. ............................. 219/110
4,419,559 12/1983 Izume et al. ....................... 219/110
4,721,906 1/1988 Ferguson et al. .................. 219/110

*Primary Examiner*—Clifford C. Shaw
*Attorney, Agent, or Firm*—Oblon, Spivak, McClelland, Maier & Neustadt

[57] ABSTRACT

A contol apparatus for a single-phase full-wave resistance welder in which anti-parallel connected thyristors are connected in series with a primary winding of a welding transformer and which controls a firing phase $\theta n$ of the thyristors to adjust a welding current, includes storage means for calculating and storing a square sum SK in such a manner that a sinusoidal value $VK = K0\sin\theta K$ having a given peak value is divided at predetermined phase intervals (1°) within a predetermined phase range (180°), and the square sum $SK = V1^2 + V2^2 + V3^2 + \ldots VK^2$ of the sinusoidal value VK with respect to each phase $\theta K$ is calculated in units of divided phases $\theta K$ ($\theta K = 1°, 2°, 3°, \ldots, 180°$) in advance, and Vx calculating means for reading out square sums Sn and Sm of the firing phase $\theta n$ and energization end phase $\theta m$ from the storage means and calculating a normalized effective value Vx of an effective voltage applied to the welding transformer.

22 Claims, 4 Drawing Sheets

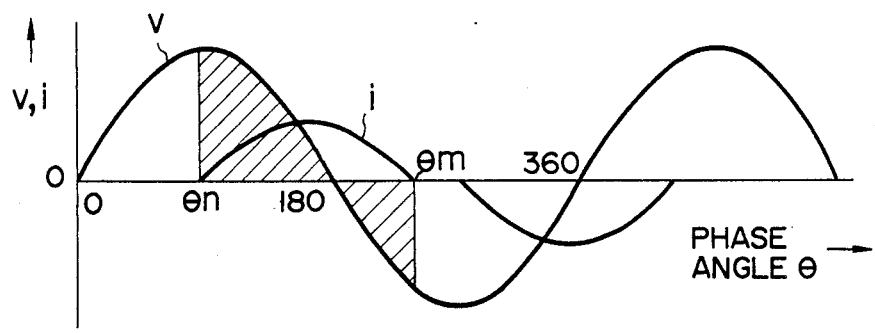
F I G. 2A
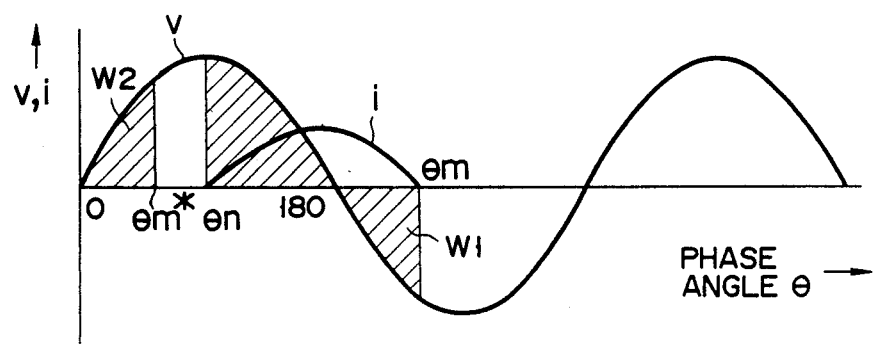
F I G. 2B

HIGH SPEED RMS CONTROL APPARATUS FOR RESISTANCE WELDERS AND HIGH SPEED RMS CONTROL METHOD THEREOF

BACKGROUND OF THE INVENTION

1. Field of the Invention

The present invention relates to a control apparatus of resistance welders and, more particularly, to a control apparatus of resistance welders, which can improve voltage control precision of single-phase full-wave resistance welders using a thyristor.

2. Description of the Related Art

Resistance welders are also called a "spot welder", and are widely used in general industrial applications such as an assembly line of a vehicle. Of the resistance welders, a single-phase full-wave resistance welder is of most popular type.

The single-phase full-wave resistance welder controls a primary voltage applied to a welding transformer using a switching element such as a thyristor, thereby controlling a secondary current of the welding transformer, i.e., a welding current.

As a control system, a current control system wherein a primary or secondary current of the welding transformer is fed back and a voltage control system wherein a voltage applied to a primary side of the welding transformer is fed back are known.

The current control system allows high-precision welding current control but requires a current detector such as a current transformer, search coil, and the like, resulting in an expensive system. In this case, when the welding transformer has two or more guns, if there is a gun through which no welding current flows, a current flowing through the remaining gun is increased accordingly. Meanwhile, the voltage control system cannot achieve high-precision welding current control but is inexpensive and economical.

FIG. 2A shows a waveform when a power supply voltage is represented by v, a primary current of the welding transformer is represented by i, and firing angle $\theta n$ is 90° in the single-phase full-wave resistance welder.

Since the welding transformer has a power factor $< 1$, current i is monotonously increased from zero to $\theta n$, and is then monotonously decreased and returns to zero at $\theta m$, thus completing half-cycle energization. In the next half cycle, a similar current flows in an opposite polarity. A power supply voltage indicated by hatching in the range of $\theta n$ to $\theta m$ is applied to the welding transformer in a half-cycle energization interval.

In the voltage control system, the voltage of the hatched portion is detected and fed back every half cycle.

When the voltage of the hatched portion is detected at every given sampling time to obtain an effective value, since initial and end values of this voltage are not zero, a detection error is generated depending on sampling start and end timings. If a sampling period is shortened, the detection error can be eliminated. However, if another control, monitoring, and the like are performed together, processing capacity of a microcomputer of a control apparatus is exceeded. As a result, a plurality of microcomputers are necessary, resulting in an expensive system.

SUMMARY OF THE INVENTION

It is a first object of the present invention to provide a control apparatus of resistance welders, which can reduce a processing load on a microcomputer and can precisely detect an effective voltage applied to a welding transformer in a predetermined sampling period at high speed. It is a second object of the present invention to provide a control apparatus of resistance welders, which can realize an inexpensive high-precision voltage control system, and can display a use rate of the welding transformer.

The control apparatus of the present invention is applied to, e.g., a single-phase full-wave resistance welder in which anti-parallel coupled thyristors are connected in series with a primary winding of a welding transformer, and firing phase $\theta n$ of each thyristor is controlled to adjust a welding current. In this control apparatus, a given phase range of sinusoidal value $VK = K0 \sin\theta K$ having a given peak value is divided in units of phases $\theta K$ at predetermined phase intervals, and square sum $SK = V1^2 + V2^2 + V2^2 + \ldots VK^2$ of the sinusoidal values VK with respect to the phases $\theta K$ is calculated in advance. The calculated square sum SK is stored in a storage means. Square sums $Sn(=V1^2 + \ldots Vn^2)$ and $Sm(=V1^2 + \ldots Vm^2)$ of firing phase $\theta n$ and energization end phase $\theta_m$ of the thyristors are read out from the storage means. On the basis of $\theta n$ and $\theta m$, normalized effective value Vx of an effective voltage applied to the welding transformer is calculated by a first calculating means.

The control apparatus of the present invention can comprise the following arrangement. Voltage v of an AC power supply is detected by a voltage detection means. Based on detected voltage v, effective voltage Vrms of the AC power supply is calculated by a calculating means. Based on the effective voltage Vrms and the normalized effective value Vx, effective voltage Vt applied to the welding transformer is calculated by a second calculating means. Based on the effective value Vx, use rate P of the welding transformer is calculated by a third calculating means. The use rate P is displayed on a display means. Furthermore, effective current Irms of the welding transformer is detected by a current detection means.

In the above arrangement, immediately after half-cycle energization of voltage v is completed, the first calculating means executes the following arithmetic operation to calculate value Vx:

$$Vx = K1 \cdot \sqrt{S180 - Sn + Sm}$$

(where K1 and S180 are constants)

The second calculating means executes the following arithmetic operation on the basis of the calculated value Vx and separately calculated effective voltage Vrms of the AC power supply so as to calculate effective voltage Vt applied to the welding transformer:

$$Vt = Vrms \cdot Vx / V180$$

(where V180 is a constant)

The third calculating means executes the following arithmetic operation on the basis of Vx to calculate use rate P of the welding transformer:

$$P = 100 Vx / V180$$

The use rate P is externally displayed by the display means.

Effective voltage Vt and effective current Irms calculated as described above are used for voltage control and current control as feedback signals.

BRIEF DESCRIPTION OF THE DRAWINGS

FIGS. 2A and 2B are waveform charts for explaining the operation of the present invention.

DETAILED DESCRIPTION OF THE PREFERRED EMBODIMENT

An embodiment of the present invention will now be described with reference to FIG. 1.

Figure 1:
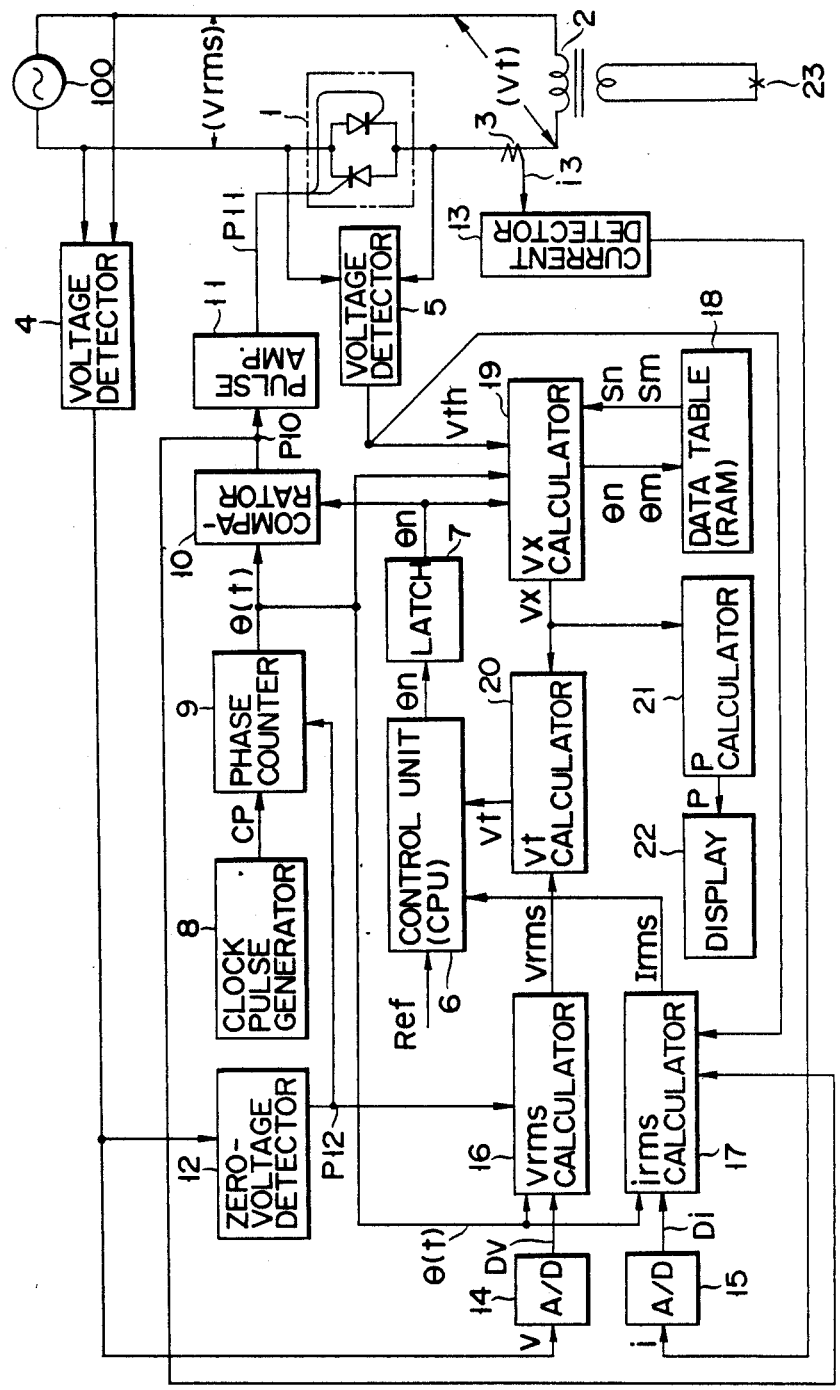
FIG. 1 is a block diagram of an embodiment according to the present invention.

In FIG. 1, reference numeral 1 denotes anti-parallel connected thyristors; 2, a welding transformer; 3, a current transformer for detecting a primary current of welding transformer 2; 4, a voltage detector for detecting a power supply voltage of AC power supply 100 and outputting signal v; and 5, a voltage detector for detecting thyristor terminal voltage (anode-cathode voltage) Vth. Reference numeral 6 denotes a control unit for calculating and outputting firing phase $\theta n$; 7, a latch for latching phase $\theta n$ output from control unit 8, a clock pulse generator for generating clock pulses CP having a given frequency; 9, a phase counter for counting clock pulses CP and outputting phase data $\theta(t)$ of voltage v; 10, a comparator for comparing output $\theta(t)$ of counter 9 with phase $\theta n$; and 11, a pulse amplifier (PA). Reference numeral 12 denotes a zero-voltage detector for outputting pulses P12 every time voltage v detected by voltage detector 4 becomes zero. Reference numeral 13 denotes a current detector for outputting signal i having a voltage proportional to secondary current i3 of current transformer 3. Reference numerals 14 and 15 denote A/D converters for converting analog signals v and i into corresponding digital signals Dv and Di; 16, a Vrms calculator for calculating effective value Vrms of a sinusoidal power supply voltage; and 17, an Irms calculator for calculating effective value Irms of a sinusoidal current. Reference numeral 18 denotes a data table (storage means) storing normalization data (to be described later); 19, a Vx calculator for calculating normalized effective voltage Vx applied to the welding transformer on the basis of firing phase angle $\theta n$ and energization end phase angle $\theta m$ (to be described later) using the normalization data; 20, a Vt calculator for calculating effective voltage Vt applied to the welding transformer on the basis of Vrms and Vx; 21, a P calculator for calculating use rate P of the welding transformer on the basis of Vx; and 22, a display for displaying the use rate P.

In the above arrangement, count value $\theta(t)$ of phase counter 9 is counted up in synchronism with pulses CP output from clock pulse generator 8. Counter 9 is reset to zero in response to output P12 of zero-voltage detector 12, and outputs phase signal $\theta(t)$ synchronous with a power supply voltage.

Control unit 6 receives control target value Ref, and effective voltage Vt or effective current Irms of the welding transformer is fed back thereto. Control unit 6 calculates firing angle $\theta n$ in accordance with these signals Ref and Vt (or Irms), and writes it in latch 7. Comparator 10 outputs pulse P10 when phase signal $\theta(t)$ coincides with firing angle $\theta n$. Pulse P10 is supplied to thyristors 1 through pulse amplifier 11. Thyristors 1 are fired in response to output pulse P11 of amplifier 11.

Control unit 6 is arranged to selectively respond to one of voltage control feedback signal Vrms and current control feedback signal Irms.

The principal part of this invention is a part for calculating effective voltage Vt of welding transformer 2 using normalized data, and will be described below.

Table 1 below shows an example of normalization data stored in data table 18. This example shows instantaneous value VK obtained by normalizing phase angle $\theta K$ in units of 1° within the range of 1° to 180° and square sum SK calculated in advance (K = 1 to 180, and in this case, K = $\theta K$). VK is an integer part of 255 sin$\theta K$ in the case of 8 bits. However, VK is not stored as data but is presented for the sake of descriptive convenience. Square sum SK is a sum of squares of instantaneous values VK, and values given by the following equations are calculated and stored in advance:

$$S1 = V1^2, S2 = S1 + V2^2, S3 = S2 + V3^2, \ldots$$

$$SK = S(K-1) + VK^2, \ldots, S180 = S179 + V180^2$$

TABLE 1

| Index (K) | Phase Angle ($\theta K$) | Instantaneous Value (VK) | Square Sum (SK) |
| --- | --- | --- | --- |
| 1 | 1 | 4 | 16 |
| 2 | 2 | 8 | 80 |
| 3 | 3 | 13 | 249 |
| 89 | 89 | 254 | 2,879,526 |
| 90 | 90 | 255 | 2,944,551 |
| 91 | 91 | 254 | 3,009,067 |
| 177 | 177 | 13 | 5,823,997 |
| 178 | 178 | 8 | 5,824,061 |
| 179 | 179 | 4 | 5,824,077 |
| 180 | 180 | 0 | 5,824,077 |

Note that when calculating portions (6, 16, 17, 19, 20, 21), in FIG. 1 are constituted by an RISC (Reduced Instruction Set Computer) type high-speed MPU, square sums SK in Table 1 may be calculated in real time. In this case, SK need not be calculated in advance.

Vx calculator 19 fetches firing phase angle data $\theta n$, and monitors detection signal Vth of a thyristor terminal voltage (anode-cathode voltage). Vx calculator 19 detects energization end phase angle $\theta m$ on the basis of phase signal $\theta(t)$ upon a change in Vth generated in a turn-off state. Thereafter, calculator 19 reads out square sums $Sn (= S(n-1) + Vn^2)$ and $Sm (= S(m-1) + Vm^2)$ from data table 18, and executes an arithmetic operation given by equation (1):

$$Vx = K1 \cdot \sqrt{S180 - Sn + Sm} \qquad (1)$$

(where K1 and S180 are constants)

Calculated value Vx means a normalized effective voltage applied to the welding transformer. More specifically, as shown in FIG. 2B, if $\theta m^* = \theta m - 180°$, voltage waveform W1 between phase angles 180° and $\theta m$ is equal to waveform W2 between phases 0° and $\theta m^*$. An effective voltage between $\theta n$ and $\theta m$ is equal to a sum effective voltage of voltages between 0° to $\theta m^*$ and between $\theta n$ and 180°. Since phase counter 9 is reset to zero every 180° (half cycle of v), the value of energization end phase angle $\theta m$ is detected as $\theta m^*$. Therefore, immediately after energization to transformer 2 is completed, data table 18 is accessed to calculate Vx in a short period of time.

Figure 3A:
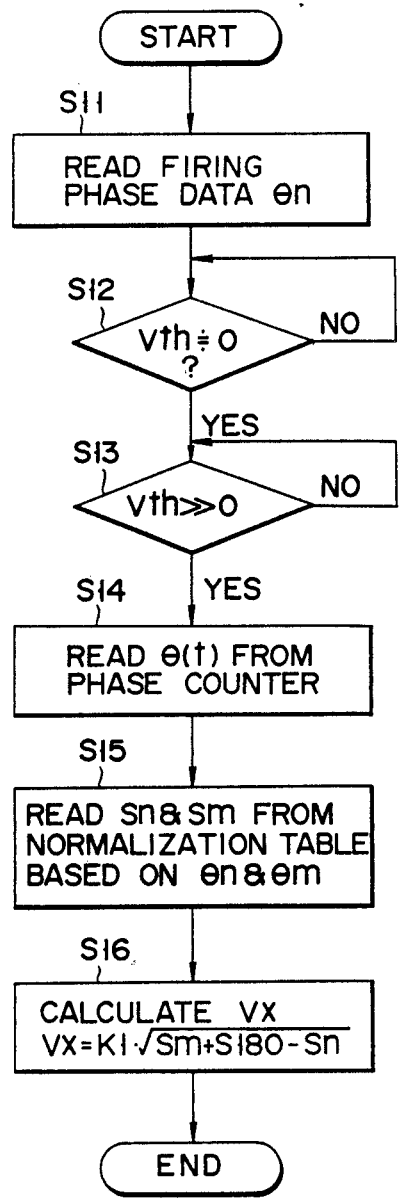
FIGS. 3A and 3B are flow charts showing examples of processing sequences of a calculating means used in the present invention.

FIG. 3A shows a processing sequence for calculating normalized effective voltage Vx.

First, Vx calculator 19 shown in FIG. 1 comprising, e.g., a microcomputer, reads firing phase angle data $\theta n$ from data table 18 (step S11).

Calculator 19 receives terminal voltage Vth of thyristors 1 detected by voltage detector 5. When voltage Vth is a small value corresponding to the ON voltage of thyristors 1 (YES in step S12) and thereafter becomes sufficiently larger than the ON voltage of thyristors 1 (YES in step S13), calculator 19 reads data $\theta(t)$ from phase counter 9 (step S14).

Calculator 19 refers to data table 18 having the content as shown in Table 1 using data $\theta m$ and $\theta(t)$ obtained until step S14, thus obtaining square sums Sn and Sm (step S15). When square sums Sn and Sm are obtained, calculator 19 performs a calculation of equation (1) (step S16) and outputs normalized effective voltage Vx.

On the other hand, effective voltage Vrms of a power supply voltage is detected and updated every half cycle by Vrms calculator 16. Vt calculator 20 calculates effective voltage Vt applied to welding transformer 2 using Vx and Vrms on the basis of equation (2), and outputs it as a feedback signal.

$$Vt = Vrms \cdot Vx/V180 \quad (2)$$

for $V180 = K1 \sqrt{S180}$ (constant)

When voltage control is selected, control unit 6 performs voltage control using Vt as a feedback signal.

Irms calculator 17 detects a current from firing phase angle $\theta n$ to energization end phase angle $\theta m$ at a predetermined sampling period, and calculates and outputs effective current Irms. When current control is selected, control unit 6 performs current control using Irms as a feedback signal.

P calculator 21 calculates and outputs use rate P of the welding transformer using Vx on the basis of equation (3), and display 22 externally displays it.

$$P = 100 \cdot Vx/V180 \quad (3)$$

Thus, the use rate of the welding transformer can be continuously monitored.

Figure 3B:
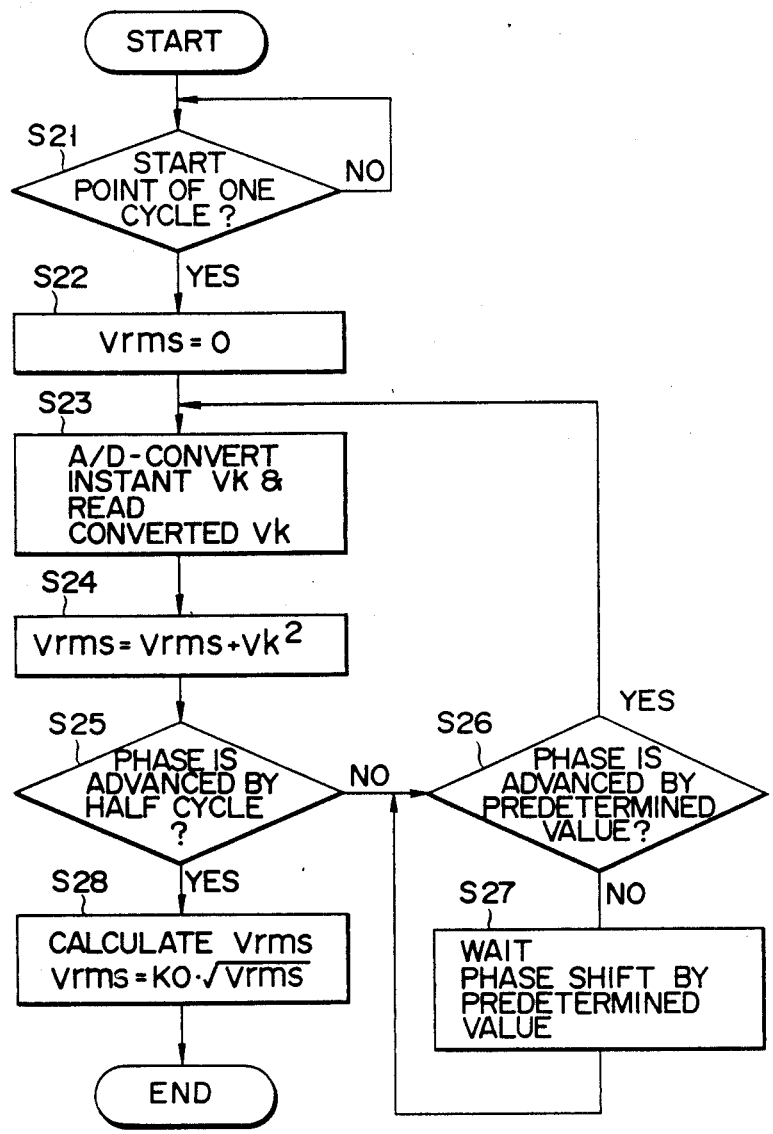

FIG. 3B shows a processing sequence for calculating effective value Vrms of a power supply voltage.

When zero-voltage detector 12 in FIG. 1 detects a zero-crossing point of power supply voltage v, it generates zero-crossing point detection pulse P12 (YES in step S21). Since power supply voltage v when pulse P12 is generated is zero, Vrms calculator 16 in FIG. 1, comprising, e.g., a microcomputer, outputs Vrms=0 (step S22).

Calculator 16 receives power supply voltage data Dv obtained by converting analog power supply voltage v into digital data by A/D converter 14 (step S23). Calculator 16 calculates new power supply voltage effective value Vrms using power supply voltage data Dv and power supply voltage effective value Vrms from detector 12 on the basis of the following equation:

$$Vrms = Vrms + VK^2 \quad (4)$$

Vrms calculated by the above equation is used as new Vrms (step S24).

Subsequently, it is checked based on data Dv if the phase of voltage v is advanced by 180° (half cycle) (step S25). If the phase shift is smaller than 180° (NO in step S25), it is checked if the phase of voltage v is advanced by a predetermined value (e.g., 1°) (step S26). If the phase shift is smaller than 1° (NO in step S26), it is waited until the phase is advanced by 1° from the present phase (step S27). If the phase of voltage v is advanced by 1° (YES in step S26), the flow returns to the processing loop of steps S23 to S25.

If it is detected in step S25 that the phase shift has reached 180° (YES in step S25), calculator 16 calculates new power supply voltage effective value Vrms on the basis of the following equation:

$$Vrms = K0 \cdot \sqrt{Vrms} \quad (5)$$

Vrms calculated by the above equation is output as new Vrms (step S28).

According to the present invention, an effective voltage applied to the welding transformer can be accurately detected at high speed, and high-precision voltage control can be achieved. Since sampling in voltage detection need not be performed at high speed, inexpensive, economical high-precision voltage control can be realized. Since use rate P of the welding transformer can be displayed, a control margin can be monitored, the apparatus is easy to use, and a reliable operation can be performed. The use rate of the welding transformer can also be displayed when current control is selected. An appropriate capacitance of the welding transformer can be easily selected.

What is claimed is:

1. A control apparatus for controlling a resistance welder which comprises a welding transformer, a primary winding of which is connected to an AC power supply and a secondary winding of which is connected to a welding gun, and a switching element inserted between said AC power supply and the primary welding of said welding transformer and fired at a predetermined firing phase, comprising:

storage means for calculating and storing a square sum SK wherein a sinusoidal wave $VK = K0 \sin\theta K$ having a predetermined peak value and corresponding to an AC component of said AC power supply is sampled at predetermined phase intervals $\theta K$ within a predetermined phase range, square values $VK^2$ of the sinusoidal wave are calculated at each of the phase intervals $\theta K$, and square sum $SK = V1^2 + V2^2 + V3^2 \ldots + VK^2$ is calculated; and Vx calculating means for reading out a value, Sn, of the square sum at the firing phase and a value, Sm, of the square sum at a phase upon completion of energization of said switching element from said storage means, and calculating a normalized effective value Vx obtained by normalizing an effective value of the AC power supply voltage on the basis of the readout square sums Sn and Sm;

control means using the normalized effective value Vx for controlling the application of a voltage to the primary winding of the welding transformer.

2. An apparatus according to claim 1, wherein said switching element includes anti-parallel connected thyristors.

3. An apparatus according to claim 1, wherein said resistance welder comprises a single-phase full-wave resistance welder.

4. An apparatus according to claim 1, wherein said storage means includes a data table storing the square sum SK calculated in advance.

5. An apparatus according to claim 1, further comprising:
- effective current detecting means for detecting an effective current Irms flowing through said welding transformer; and
- means for current-controlling said switching element using the effective current Irms as a control feedback signal.

6. An apparatus according to claim 1, wherein the normalized effective Vx is defined by $$Vx = K1\sqrt{S180 - Sn + Sm}$$

where K1 and S180 are constants.

7. A control apparatus used for controlling a resistance welder which comprises a welding transformer, a primary winding of which is connected to an AC power supply and a secondary winding of which is connected to a welding gun, and a switching element inserted between said AC power supply and the primary winding of said welding transformer and fired at a predetermined firing phase, comprising:
- storage means for calculating and storing a square sum SK wherein a sinusoidal wave $VK = K0 \sin\theta K$ having a predetermined peak value and corresponding to an AC component of said AC power supply is sampled at predetermined phase intervals $\theta K$ within a predetermined phase range, square values $VK^2$ of the sinusoidal wave are calculated at each of the phase intervals $\theta K$ and square sum $SK = V1^2 + V2^2 + V3^2 + \ldots + VK^2$ is calculated;
- Vx calculating means for reading out a value, Sn, of the square sum at the firing phase and a value, Sm, of the square sum at a phase upon completion of energization of said switching element from said storage means and calculating a normalized effective value Vx obtained by normalizing an effective value of the AC power supply voltage on the basis of read out square sums Sn and Sm;
- voltage detecting means for detecting a voltage of said AC power supply;
- Vrms calculating means for calculating an effective value Vrms from the AC power supply voltage detected by said voltage detecting means;
- Vt calculating means for calculating an effective voltage Vt applied to the primary winding of said welding transformer using the effective value Vrms and the normalized effective value Vs;
- control means for controlling the application of an effective voltage Vt to the primary of the welding transformer; and
- means for voltage-controlling said switching element using the effective voltage Vt as a control feedback signal.

8. A control apparatus used for controlling a resistance welder which comprises a welding transformer, a primary winding of which is connected to an AC power supply and a secondary winding of which is connected to a welding gun, and a switching element inserted between said AC power supply and the primary winding of said welding transformer and fired at a predetermined firing phase, comprising:
- storage means for calculating and storing a square sum SK wherein a sinusoidal wave $VK = K0 \sin\theta K$ having a predetermined peak value and corresponding to an AC component of said AC power supply is sampled at predetermined phase intervals $\theta K$ within a predetermined phase range, square value $VK^2$ of the sinusoidal wave are calculated at each of the phase intervals $\theta K$ and square sum $SK = V1^230\ V2^2 + V3^2 + \ldots + VK^2$ is calculated;
- Vx calculating means for reading out a value, Sn, or the square sum at the firing phase and a value, Sm, of the square sum at a phase upon completion of energization of said switching element from said storage means, and calculating a normalized effective value Vx obtained by normalizing an effective value of the AC power supply voltage on the basis of read out square sums Sn and Sm;
- control means using the normalized effective value Vx for controlling the application of a voltage to the primary winding of the welding transformer;
- P calculating means for calculating a use rate P of said welding transformer on the basis of a ratio of a present value to a maximum value of the normalized effective value Vx; and
- means for displaying the calculated use rate P.

9. A control apparatus for controlling a resistance welder which comprises a welding transformer, a primary winding of which is connected to an AC power supply and a secondary winding of which is connected to a welding gun, and a switching element inserted between said AC power supply and the primary winding of said welding transformer and fired at a predetermined firing phase, comprising:
- storage means for calculating and storing a square sum SK wherein a sinusoidal waveform $VK \sin\theta K$ corresponding to an AC component of said AC power supply is sampled at predetermined phase intervals $\theta K$, and square values $VK^2$ of the AC components are calculated at each of the predetermined phase intervals $\theta K$ square sum $SK = V1^2 + V2^2V + V3^2 + \ldots + VK^2$ wave VK corresponding to the phases is calculated;
- Vx calculating means for reading out a value, Sn, of the square sum at the firing phase and a value, Sm, of the square sum at a phase upon completion of energization of said switching element from said storage means and calculating a normalized effective value Vx obtained by normalizing an effective value of the AC power supply voltage on the basis of the readout square sums Sn and Sm;
- control means using the normalized effective value Vx for controlling the application of a voltage to the primary of the welding transformer;
- P calculating means for calculating a use rate P of said welding transformer on the basis of a ratio of a present value to a maximum value of the normalized effective value Vx; and
- means for displaying the calculated use rate P.

10. An apparatus according to claim 9, further comprising:
- Vrms calculating means for calculating an effective value Vrms of an AC voltage of said AC power supply;
- Vt calculating means for calculating an effective voltage Vt applied to the secondary winding of said welding transformer using the effective value Vrms and the normalized effective value Vx; and
- means for voltage-controlling said switching element using the effective voltage Vt as a control feedback signal.

11. A method for controlling a resistance welder which comprises a welding transformer, a primary winding of which is connected to an AC power supply and a secondary winding of which is connected to a welding gun, and a switching element inserted between said AC power supply and the primary winding of said welding transformer and fired at a predetermined firing phase, comprising the steps of:

sampling a sinusoidal wave $VK = K0\sin\theta K$ having a predetermined peak value and corresponding to an AC component of said AC power supply at predetermined phase intervals $\theta K$ within a predetermined phase range;

calculating square values $VK^2$ of the sinusoidal wave at each of said phase intervals $\theta K$;

calculating a square sum $SK = V1^2 + V2^2 + V3^2 + \ldots + VK^2$;

calculating a normalized effective value Vx obtained by normalizing an effective value of the AC power supply voltage on the basis of a value, Sn, of the square sum at the firing phase and a value, Sm, of the square sum at a phase upon completion of energization of said switching element; and controlling the application of a voltage to the primary of the welding transformer using the normalized effective value Vx.

12. A method according to claim 11, further comprising the steps of:

detecting a voltage of said AC power supply;

calculating an effective value Vrms using the detected AC power supply voltage;

calculating the effective voltage Vt applied to the primary winding of said welding transformer using the effective value Vrms and the normalized effective value Vx; and voltage-controlled said switching element using the effective voltage Vt as a control feedback signal.

13. A method according to claim 11, further comprising the steps of:

detecting an effective current Irms flowing through said welding transformer; and current-controlling said switching element using the effective current Irms as a control feedback signal.

14. A method for controlling a resistance welder which comprises a welding transformer, a primary winding of which is connected to an AC power supply and a secondary winding of which is connected to a welding gun, and a switching element inserted between said AC power supply and the primary winding of said welding transformer and fired at a predetermined firing phase, comprising the steps of:

sampling a sinusoidal wave $VK = K0\sin\theta K$ having a predetermined peak value and corresponding to an AC component of said AC power supply at predetermined phase intervals $\theta K$ within a predetermined phase range;

calculating square values $VK^2$ of the sinusoidal wave at each of said phase intervals $\theta K$;

calculating a square sum $SK = V1^2 + V2^2 + V3^2 + \ldots + VK^2$;

calculating a normalized effective value Vx obtained by normalizing an effective value of the AC power supply voltage on the basis of a value, Sn, of the square sum at the firing phase and a value, Sm, of the square sum at a phase upon completion of energization of said switching element;

controlling the application of a voltage to the primary of the welding transformer using the normalized effective value Vx;

calculating a use rate P of said welding transformer on the basis of a ratio of a present value to a maximum value of the normalized effective value Vx; and displaying the calculated use rate P.

15. A method for controlling a resistance welder which comprises a welding transformer, a primary winding of which is connected to an AC power supply and a secondary winding of which is connected to a welding gun, and a switching element inserted between said AC power supply and the primary winding of said welding transformer and fired at a predetermined firing phase, comprising the steps of:

sampling a sinusoidal wave $VK = K0\sin\theta K$ having a predetermined peak value and corresponding to an AC component of said AC power supply at predetermined phase intervals $\theta K$ within a predetermined phase range;

calculating square values $VK^2$ of the sinusoidal wave at each of said phase intervals $\theta K$;

calculating a square sum $SK = V1^2 + V2^2 + V3^2 + \ldots + VK^2$;

calculating a normalized effective value Vx obtained by normalizing an effective value of the AC power supply voltage on the basis of the value, Sn, of the square sum at the firing phase and a value, Sm, of the square sum at a phase upon completion of energization of said switching element;

detecting a voltage of said AC power supply;

calculating an effective value Vrms using the detected AC power supply voltage;

calculating the effective voltage Vt applied to the primary winding of said welding transformer using the effective value Vrms and the normalized effective value Vx;

controlling the application of the effective voltage Vt to the primary of the welding transformer;

voltage-controlling said switching element using the effective voltage Vt as a control feedback signal;

calculating a use rate P of said welding transformer on the basis of a ratio of a present value to a maximum value of the normalized effective value Vx; and displaying the calculated use rate P.

16. A method for controlling a resistance welder which comprises a welding transformer, a primary winding of which is connected to an AC power supply and a secondary winding of which is connected to a welding gun, and a switching element inserted between said AC power supply and the primary winding of said welding transformer and fired at a predetermined firing phase, comprising the steps of:

sampling a sinusoidal value $VK = K0\sin\theta K$ having a predetermined peak value and corresponding to an AC component of said AC power supply at predetermined phase intervals $\theta K$ within a predetermined phase range;

calculating square values $VK^2$ of the sinusoidal wave at each of said phase intervals $\theta K$;

calculating a square sum $SK = V1^2 + V2^2 + V3^3 + \ldots + VK^2$;

calculating a normalized effective value Vx obtained by normalizing an effective value of the AC power supply voltage on the basis of a value, Sn, of the square sum at the firing phase and a value, Sm, of the square sum at a phase upon completion of energization of said switching element;

controlling the application of a voltage to the primary of the welding transformer using the normalized effective voltage Vx;

detecting an effective current Irms flowing through said welding transformer;

current-controlling said switching element using the effective current Irms as a control feedback signal;

calculating a use rate P of said welding transformer on the basis of a ratio of a present value to a maximum value of the normalized effective value Vx; and displaying the calculated use rate P.

17. A control apparatus for controlling a single-phase full-wave resistance welder in which anti-parallel connected thyristors are connected in series with a primary winding of a welding transformer and which controls a firing phase $\theta n$ of said thyristors to adjust a welding current, comprising:

storage means for calculating and storing a square sum SK wherein a sinusoidal value $VK32\ K0\ \sin\theta K$ having a given peak value is sampled at predetermined phase intervals $\theta K$ within a predetermined phase range, and the square sum $SK = V1^2 + V2^2 + V3^2 + \ldots + VK^2$ of the sinusoidal value VK with respect to each phase interval $\theta K$ is calculated in advance;

first calculating means for reading out square sums Sn and Sm at the firing phase $\theta n$ and energization end phase $\theta m$ from said storage means and calculating a normalized effective value Vx of an effective voltage applied to said welding transformer; and control means using the normalized effective value Vx for controlling the application of a voltage to the primary of the welding transformer.

18. An apparatus according to claim 17, further comprising:

voltage detecting means for detecting a voltage of an AC power supply;

Vrms calculating means for calculating an effective voltage Vrms of said AC power supply from the detected voltage;

second calculating means for calculating an effective voltage Vt applied to said welding transformer on the basis of the effective voltage Vrms and the normalized effective value Vx; and voltage control means for performing voltage control using the effective voltage Vt as a feedback signal.

19. An apparatus according to claim 17, further comprising:

effective current detecting means for detecting an effective current Irms of said welding transformer; and current control means for performing current control using the effective current Irms as a feedback signal.

20. An apparatus according to claim 17, wherein the normalized effective Vx is defined by $$Vx = K1\sqrt{S180 - Sn + Sm}$$

where K1 and S180 are constants.

21. A control apparatus for controlling a single-phase full-wave resistance welder in which anti-parallel connected thyristors are connected in series with a primary winding of a welding transformer and which controls a firing phase $\theta n$ of said thyristors to adjust a welding current, comprising:

storage means for calculating and storing a square sum SK wherein a sinusoidal value $VK = K0 \sin\theta K$ having a given peak value is sampled at predetermined phase intervals $\theta K$ within a predetermined phase range, and the square sum $SK = V1^2 + V2^2 + V3^2 + \ldots VK^2$ of the sinusoidal value VK with respect to each phase interval $\theta K$ is calculated in advance;

first calculating means for reading out square sums Sn and Sm at the firing phase $\theta n$ and energization end phase $\theta m$ from said storage means and calculating a normalized effective value Vx of an effective voltage applied to said welding transformer;

control means using the normalized effective value Vx for controlling the application of a voltage to the primary of the welding transformer;

third calculating means for calculating a use rate P of said welding transformer; and display means for displaying the use rate P.

22. A control apparatus for controlling a single-phase full-wave resistance welder in which anti-parallel connected thyristors are connected in series with a primary winding of a welding transformer and which controls a firing phase $\theta n$ of said thyristors to adjust a welding current, comprising:

storage means for calculating and storing a square sum SK wherein a sinusoidal value $VK = K0 \sin\theta K$ having a given peak value is sampled at predetermined phase intervals $\theta K$ within a predetermined phase range, and the square sum $SK = V1^2 + V2^2 + V3^2 + \ldots VK^2$ of the sinusoidal value VK with respect to each phase interval $\theta K$ is calculated in advance;

first calculating means for reading out square sums Sn and Sm at the firing phase $\theta n$ and energization end phase $\theta m$ from said storage means and calculating a normalized effective value Vx of an effective voltage applied to said welding transformer;

control means using the normalized effective value Vx for controlling the application of a voltage to the primary of the welding transformer;

third calculating means for calculating a use rate P of said welding transformer;

display means for displaying the use rate P;

effective current detecting means for detecting an effective current Irms of said welding transformer; and current control means for performing current control using the effective current Irms as a feedback signal.

* * * * *